US011682220B2

(12) United States Patent
Ayyadevara et al.

(10) Patent No.: US 11,682,220 B2
(45) Date of Patent: Jun. 20, 2023

(54) OVERLAP-AWARE OPTICAL CHARACTER RECOGNITION

(71) Applicant: Optum Technology, Inc., Eden Prairie, MN (US)

(72) Inventors: V Kishore Ayyadevara, Hyderabad (IN); Yerraguntla Yeshwanth Reddy, Hyderabad (IN); Snigdha Sree Borra, Hyderabad (IN); Nilav Baran Ghosh, Hyderabad (IN); Santosh Kumar Jami, Hyderabad (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 136 days.

(21) Appl. No.: 17/201,778

(22) Filed: Mar. 15, 2021

(65) Prior Publication Data

US 2022/0292294 A1    Sep. 15, 2022

(51) Int. Cl.
*G06V 30/148* (2022.01)
*G06N 20/00* (2019.01)
*G06V 30/224* (2022.01)
*G06V 30/10* (2022.01)

(52) U.S. Cl.
CPC .......... *G06V 30/153* (2022.01); *G06N 20/00* (2019.01); *G06V 30/224* (2022.01); *G06V 30/10* (2022.01)

(58) Field of Classification Search
CPC .... G06V 30/153; G06V 30/224; G06V 30/10; G06N 20/00
See application file for complete search history.

(56) References Cited

U.S. PATENT DOCUMENTS

| 7,650,035 B2 | 1/2010 | Vincent et al. |
| 7,724,957 B2 | 5/2010 | Abdulkader |
| 8,208,698 B2 * | 6/2012 | Bogdan ................. G06T 7/0012 382/128 |

(Continued)

FOREIGN PATENT DOCUMENTS

| WO | 2019/192397 A1 | 10/2019 | |
| WO | WO-2019192397 A1 * | 10/2019 | ........... G06K 9/3233 |

OTHER PUBLICATIONS

Baek, Youngmin et al. "Character Region Awareness for Text Detection," In Proceedings of the IEEE/CVF Conference on Computer Vision and Pattern Recognition, Jun. 15, 2019, pp. 9365-9374, DOI: 10.1109/CVPR.2019.00959.

(Continued)

*Primary Examiner* — Doon Y Chow
(74) *Attorney, Agent, or Firm* — Alston & Bird LLP

(57) ABSTRACT

Solutions for more efficient and effective optical character recognition with respect to an input text segment are disclosed. In one example, a method includes processing an input text image using a deep character overlap detection machine learning model in order to generate a character map for the input text image, an overlap map for the input text image, and an affinity map for the input text image; generating an overlap-aware word boundary recognition output (Continued)

701

702 based at least in part on the character map, the overlap map, and the affinity map, wherein the overlap-aware word boundary recognition output describes one or more inferred word regions of the input text image; and performing one or more prediction-based actions based at least in part on the overlap-aware word boundary recognition output.

17 Claims, 17 Drawing Sheets

(56) References Cited

U.S. PATENT DOCUMENTS

| | | | |
|---|---|---|---|
| 8,509,534 B2 * | 8/2013 | Galic | G06V 30/1478 |
| | | | 382/176 |
| 8,649,600 B2 * | 2/2014 | Saund | G06V 30/40 |
| | | | 382/175 |
| 8,917,935 B2 * | 12/2014 | Epshtein | G06V 20/63 |
| | | | 382/176 |
| 9,430,704 B2 | 8/2016 | Abdollahian | |
| 9,830,508 B1 * | 11/2017 | Winder | G06V 10/28 |
| 9,965,719 B2 | 5/2018 | Choi et al. | |
| 10,445,569 B1 | 10/2019 | Lin et al. | |
| 10,467,464 B2 | 11/2019 | Chen et al. | |
| 10,762,376 B2 | 9/2020 | Liu et al. | |
| 2015/0169972 A1 * | 6/2015 | Vu | G06V 30/15 |
| | | | 382/182 |

OTHER PUBLICATIONS

Burkov, Egor et al. "Deep Neural Networks With Box Convolutions," In Proceedings of the 32nd International Conference on Neural Information Processing Systems, Dec. 3, 2018 (11 pages).

Deshpande, Adit. "The 9 Deep Learning Papers You Need to Know About (Understanding CNNs Part 3)," Aug. 24, 2016, (16 pages), (article, online), [Retrieved from the Internet Sep. 2, 2020] <https://web.archive.org/web/20180703192302/https://adeshpande3.github.io/The-9-Deep-Learning-Papers-You-Need-To-Know-About.html>.

Paszke, Adam et al. "ENet: A Deep Neural Network Architecture for Real-Time Semantic Segmentation," preprint arXiv:1606.02147v1 [cs.CV], Jun. 7, 2016, (10 pages), https://arxiv.org/pdf/1606.02147.pdf)%C3%AC%20%E2%82%AC.

Ronneberger, Olaf et al. "U-Net: Convolutional Networks for Biomedical Image Segmentation," preprint arXiv: 1505.04597v1 [cs.CV], May 18, 2015, (8 pages), https://arxiv.org/pdf/1505.04597.pdf.

* cited by examiner

Optum
601

Global
602

Solutions
603

FIG. 6

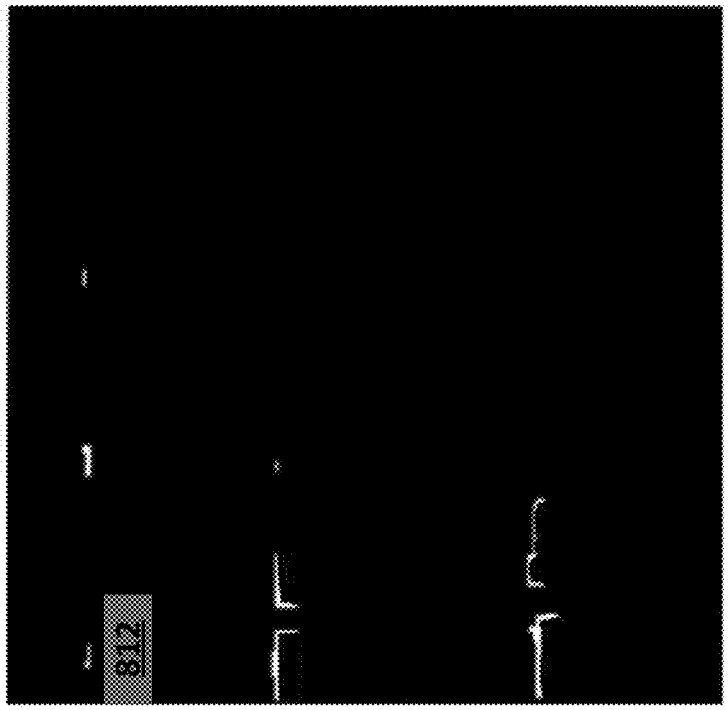
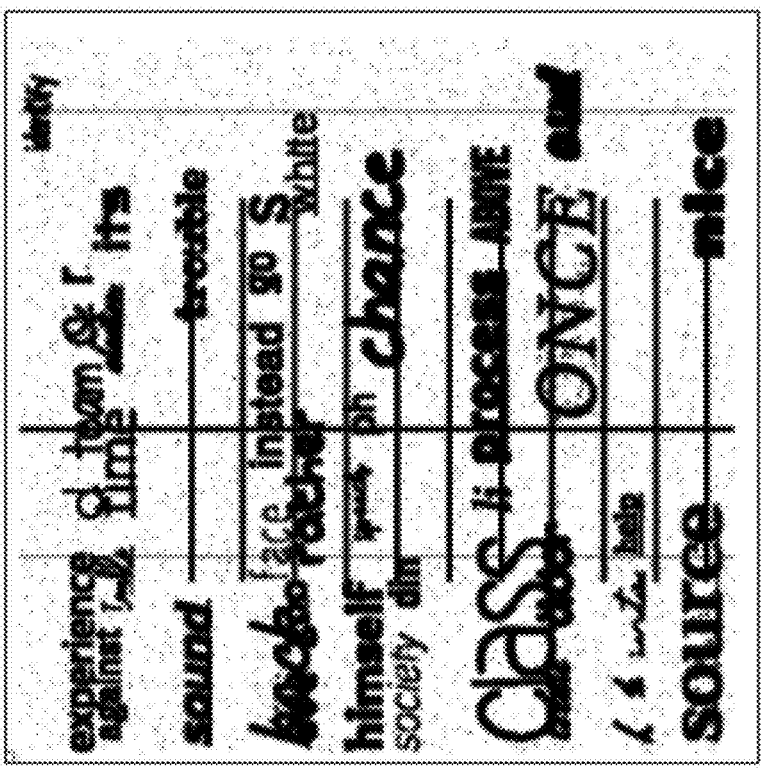
FIG. 8

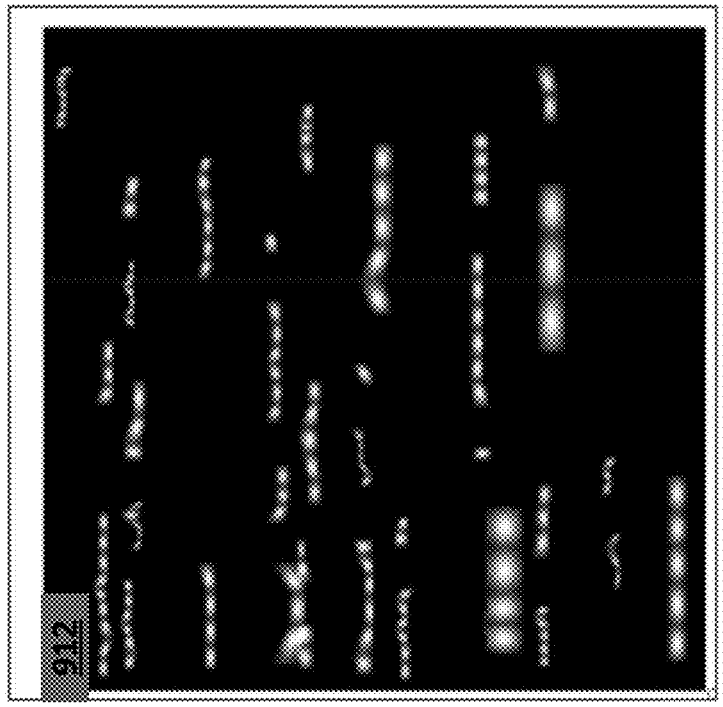
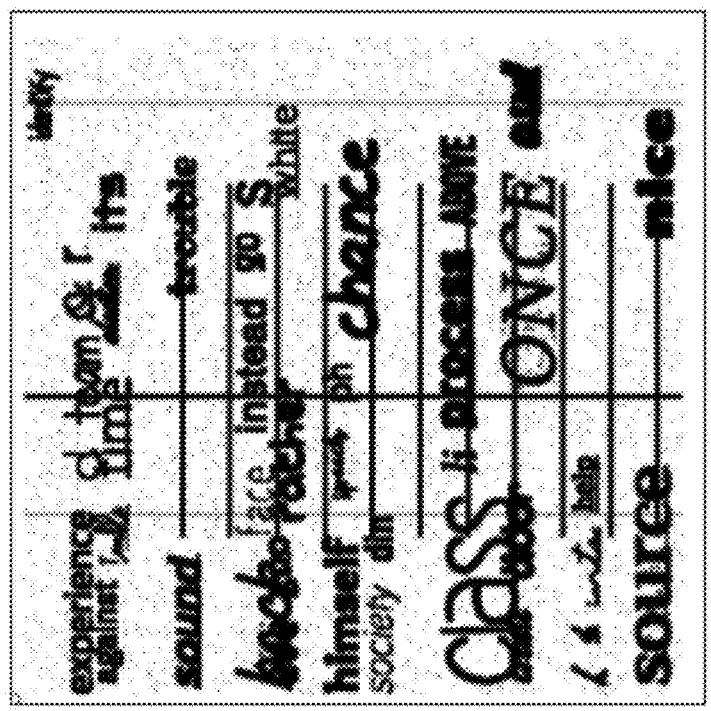
FIG. 9

Perform image-wise subtraction operation to generate an overlap-removed character map
1101
Perform image-wise addition operation to generate an affinity-aware character map
1102
Generate the overlap-aware optical character recognition output
1103
FIG. 11

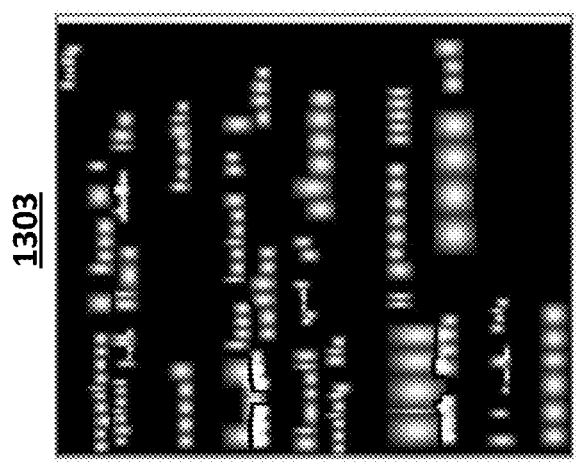
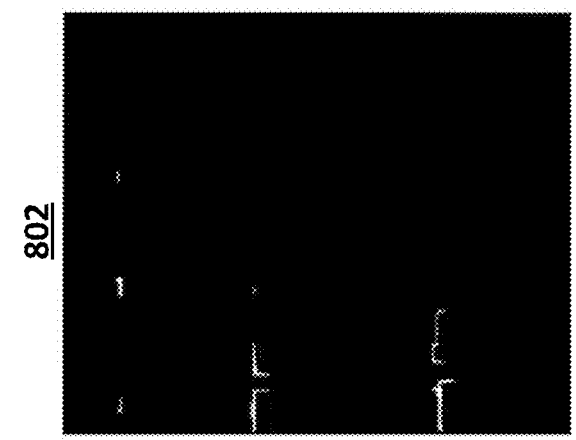
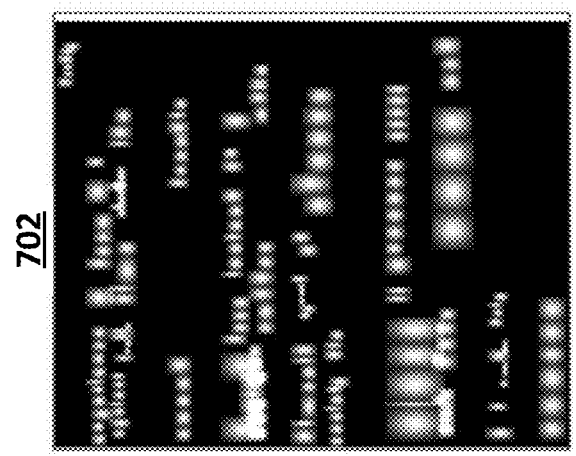
FIG. 13

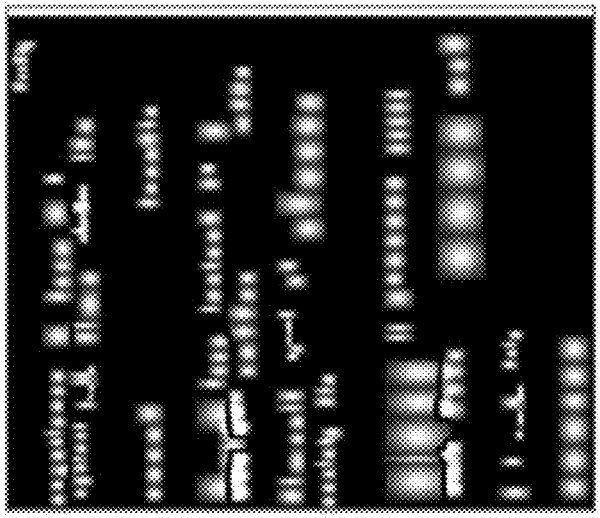
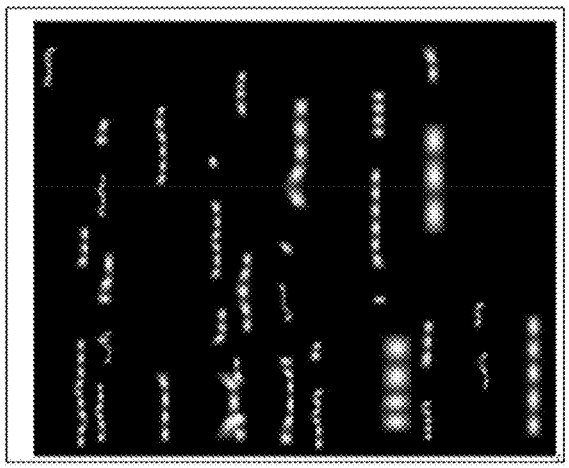
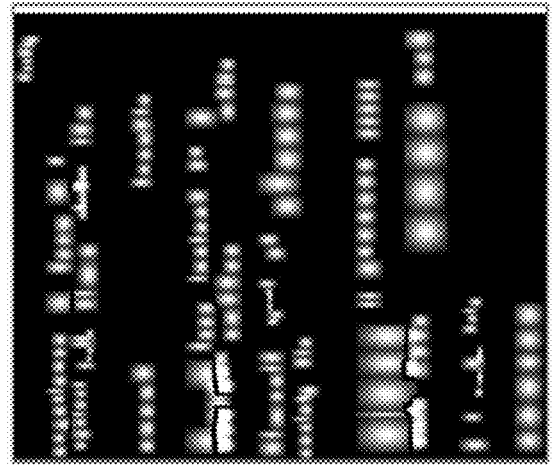
FIG. 15

OVERLAP-AWARE OPTICAL CHARACTER RECOGNITION

BACKGROUND

Various embodiments of the present invention address technical challenges related to performing efficient and effective optical character recognition.

BRIEF SUMMARY

In general, embodiments of the present invention provide methods, apparatuses, systems, computing devices, computing entities, and/or the like for performing efficient and effective optical character recognition using deep character overlap detection machine learning models.

In accordance with one aspect, a method includes: processing an input text image using a deep character overlap detection machine learning model in order to generate a character map for the input text image, an overlap map for the input text image, and an affinity map for the input text image; generating an overlap-aware word boundary recognition output based at least in part on the character map, the overlap map, and the affinity map, wherein: (i) the overlap-aware word boundary recognition output describes one or more inferred word regions of the input text image, and (ii) the overlap-aware word boundary recognition output is determined by performing one or more image-wise arithmetic operations across the character map, the overlap map, and the affinity map; and performing one or more prediction-based actions based at least in part on the overlap-aware word boundary recognition output.

In accordance with another aspect, an apparatus comprising at least one processor and at least one memory including program code, the at least one memory and the program code configured to, with the processor, cause the apparatus to at least: process an input text image using a deep character overlap detection machine learning model in order to generate a character map for the input text image, an overlap map for the input text image, and an affinity map for the input text image; generate an overlap-aware word boundary recognition output based at least in part on the character map, the overlap map, and the affinity map, wherein: (i) the overlap-aware word boundary recognition output describes one or more inferred word regions of the input text image, and (ii) the overlap-aware word boundary recognition output is determined by performing one or more image-wise arithmetic operations across the character map, the overlap map, and the affinity map; and perform one or more prediction-based actions based at least in part on the overlap-aware word boundary recognition output.

In accordance with yet another aspect, a computer program product computer program comprising at least one non-transitory computer-readable storage medium having computer-readable program code portions stored therein, the computer-readable program code portions configured to: process an input text image using a deep character overlap detection machine learning model in order to generate a character map for the input text image, an overlap map for the input text image, and an affinity map for the input text image; generate an overlap-aware word boundary recognition output based at least in part on the character map, the overlap map, and the affinity map, wherein: (i) the overlap-aware word boundary recognition output describes one or more inferred word regions of the input text image, and (ii) the overlap-aware word boundary recognition output is determined by performing one or more image-wise arithmetic operations across the character map, the overlap map, and the affinity map; and perform one or more prediction-based actions based at least in part on the overlap-aware word boundary recognition output.

BRIEF DESCRIPTION OF THE DRAWINGS

Figure 1:
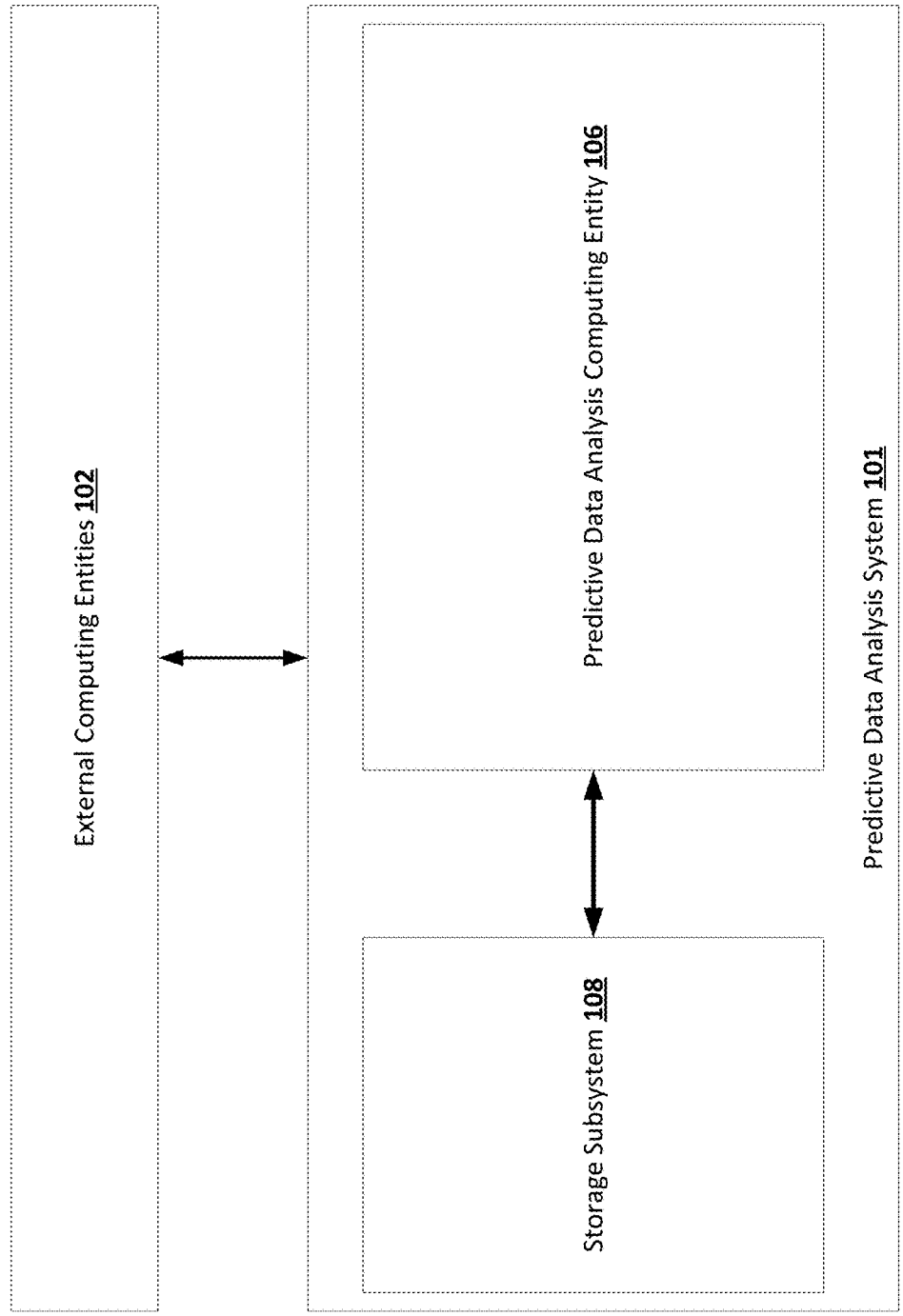
Figure 2:
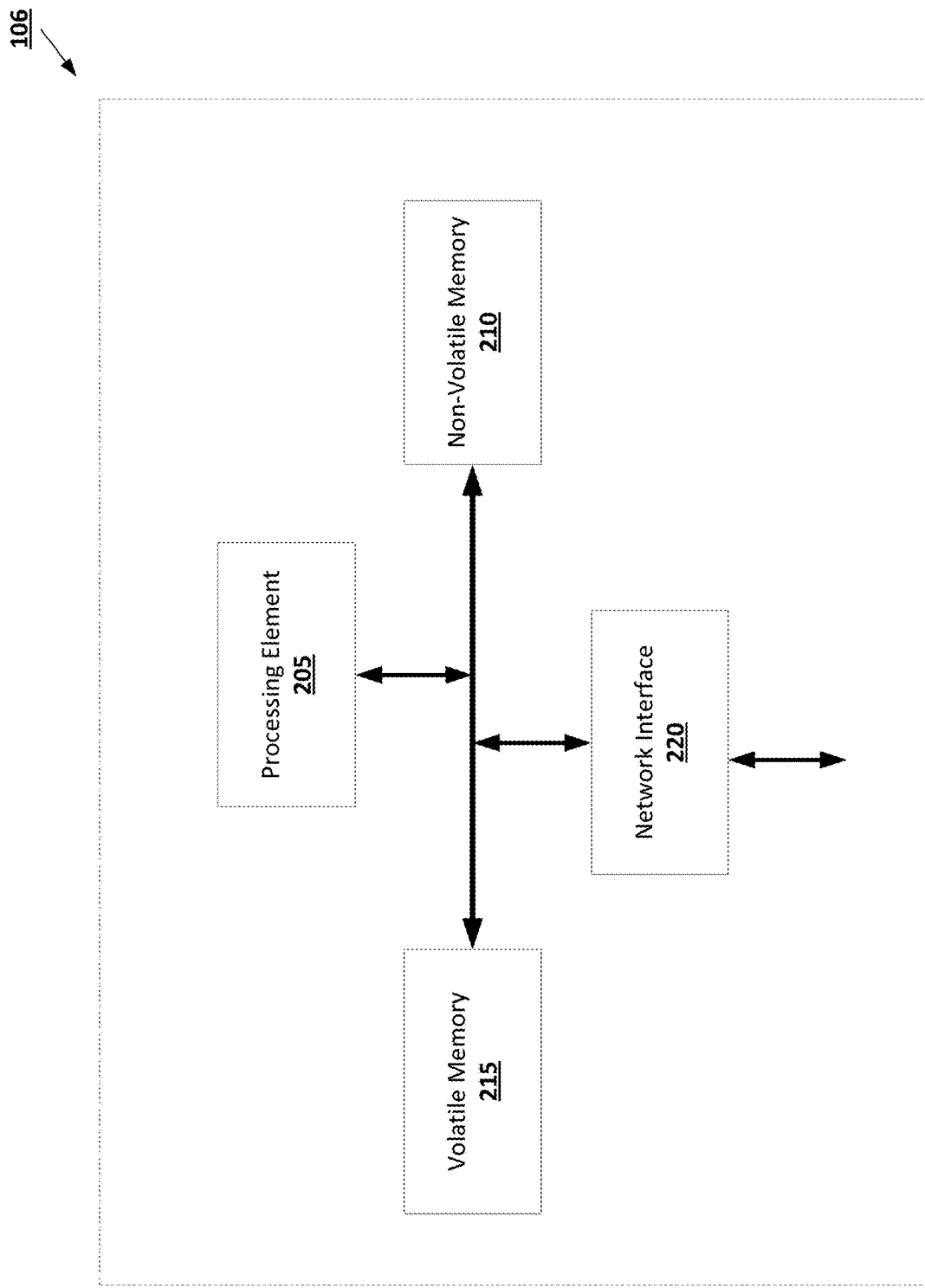
Figure 3:
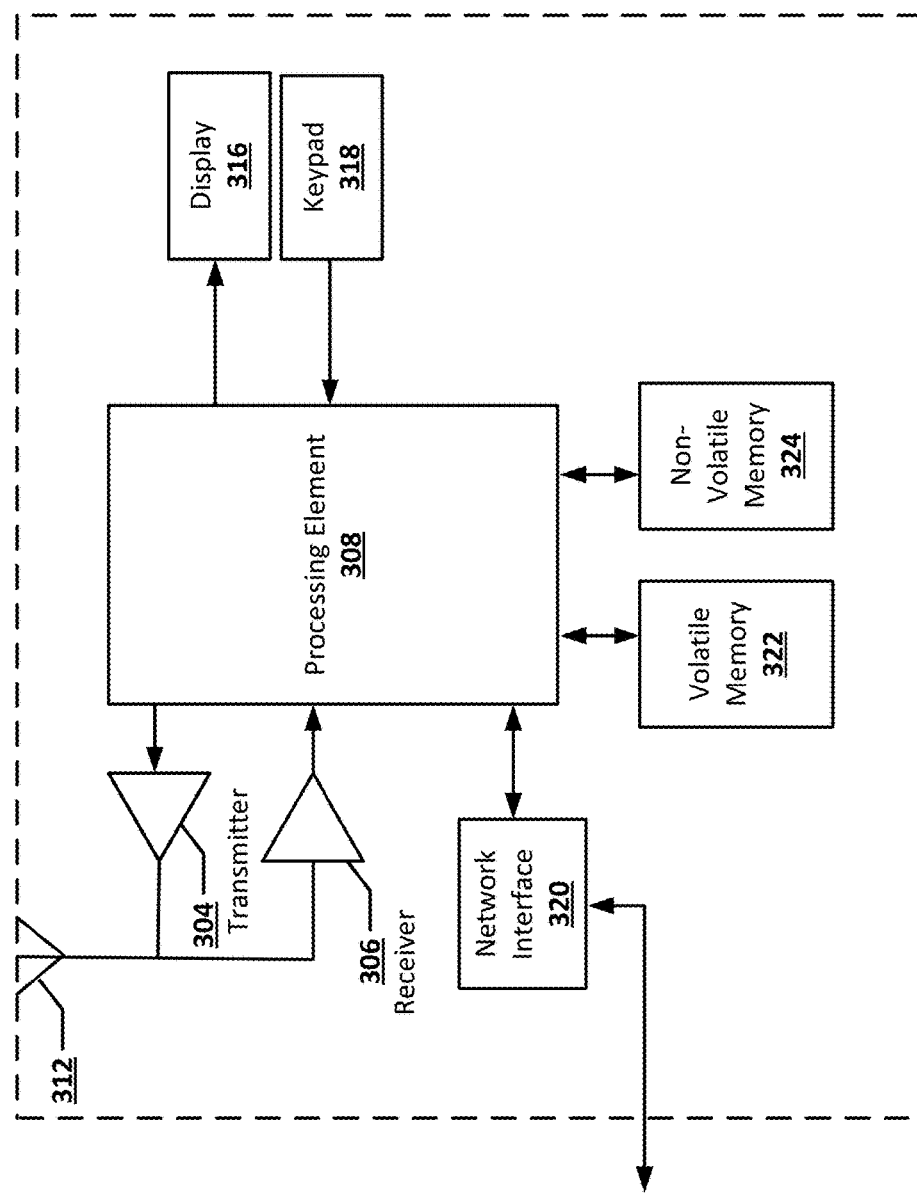
Figure 4:
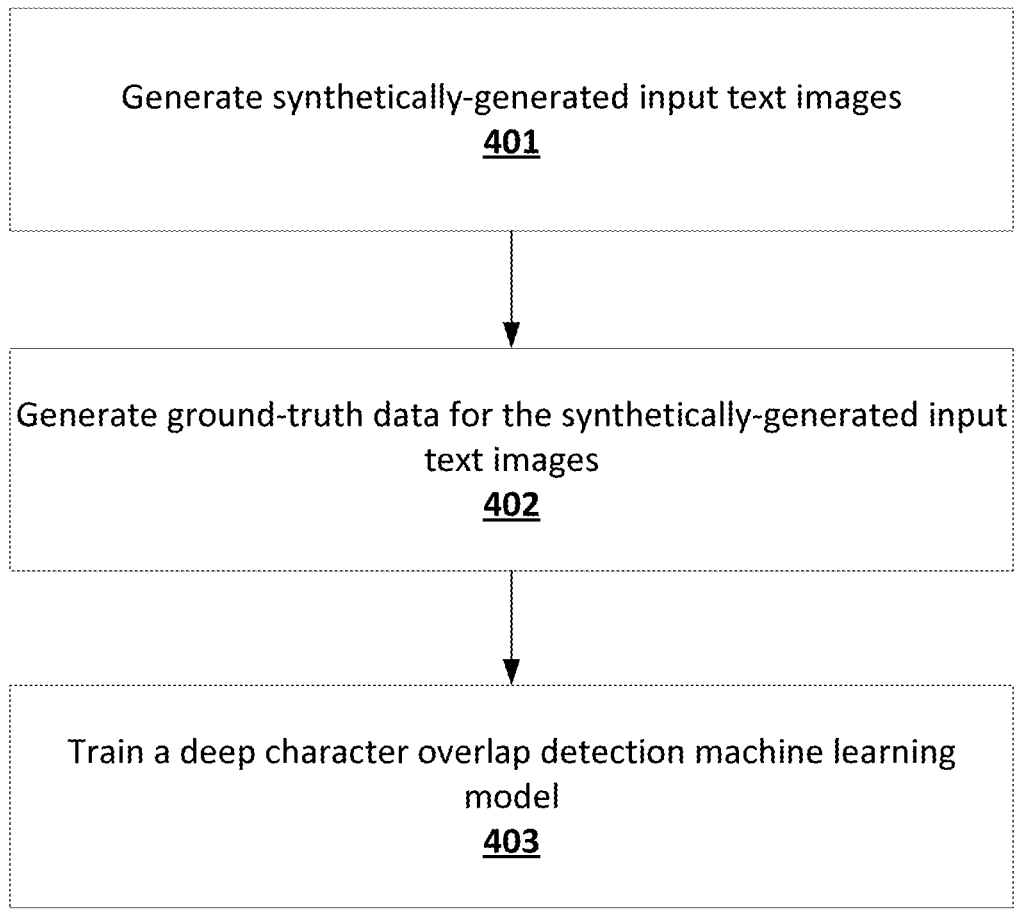
Figure 5:
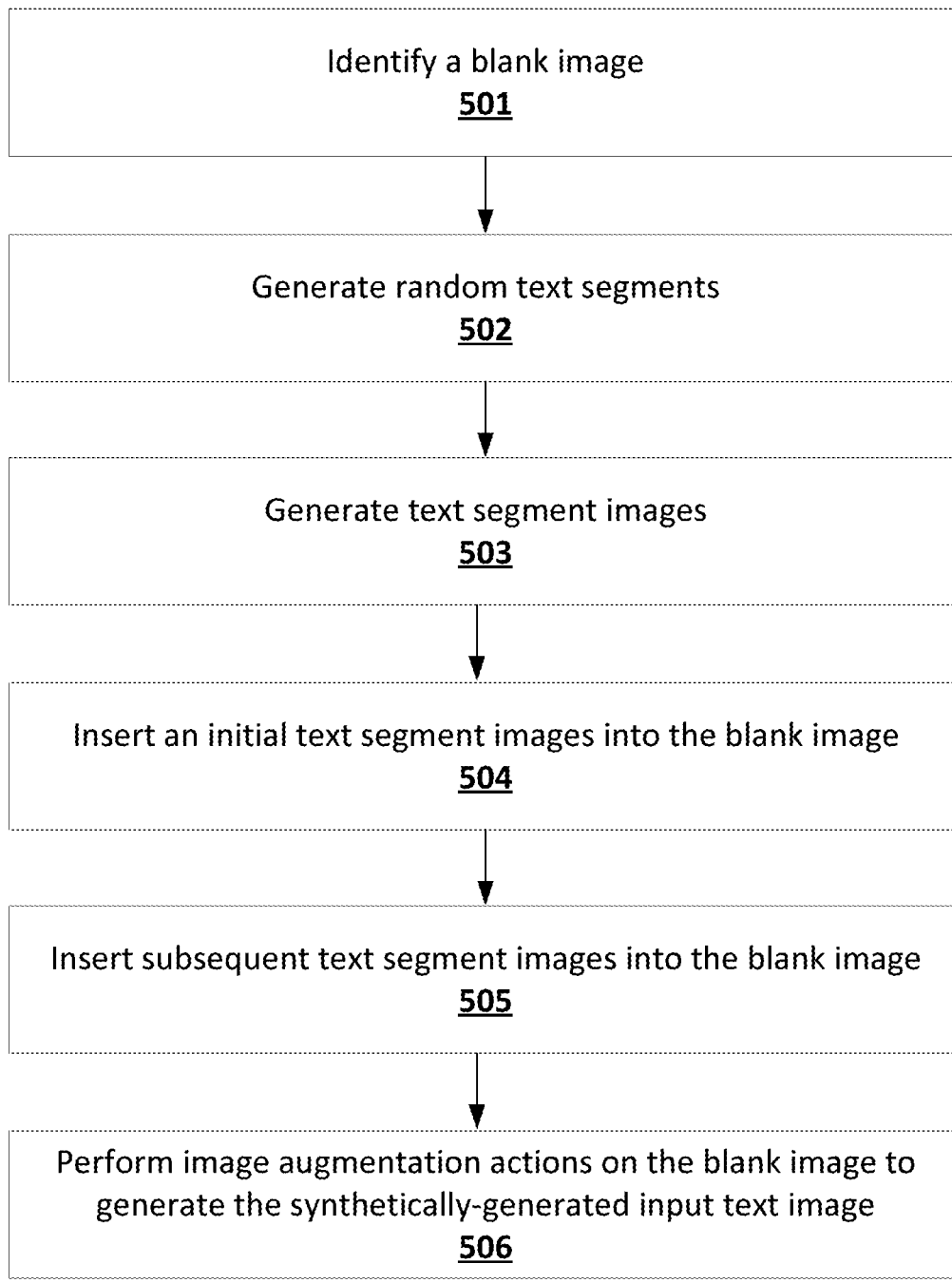
Figure 7:
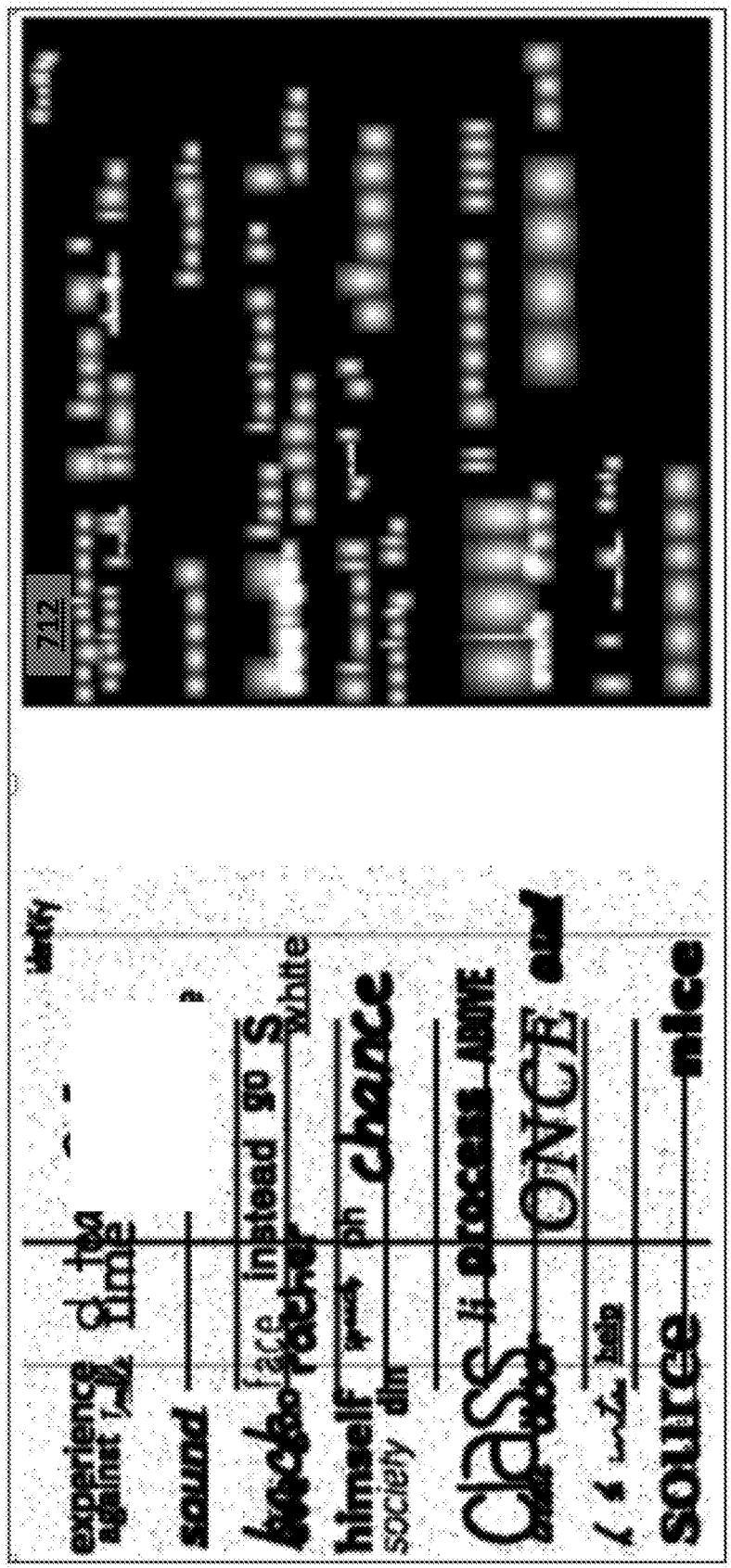
Figure 10:
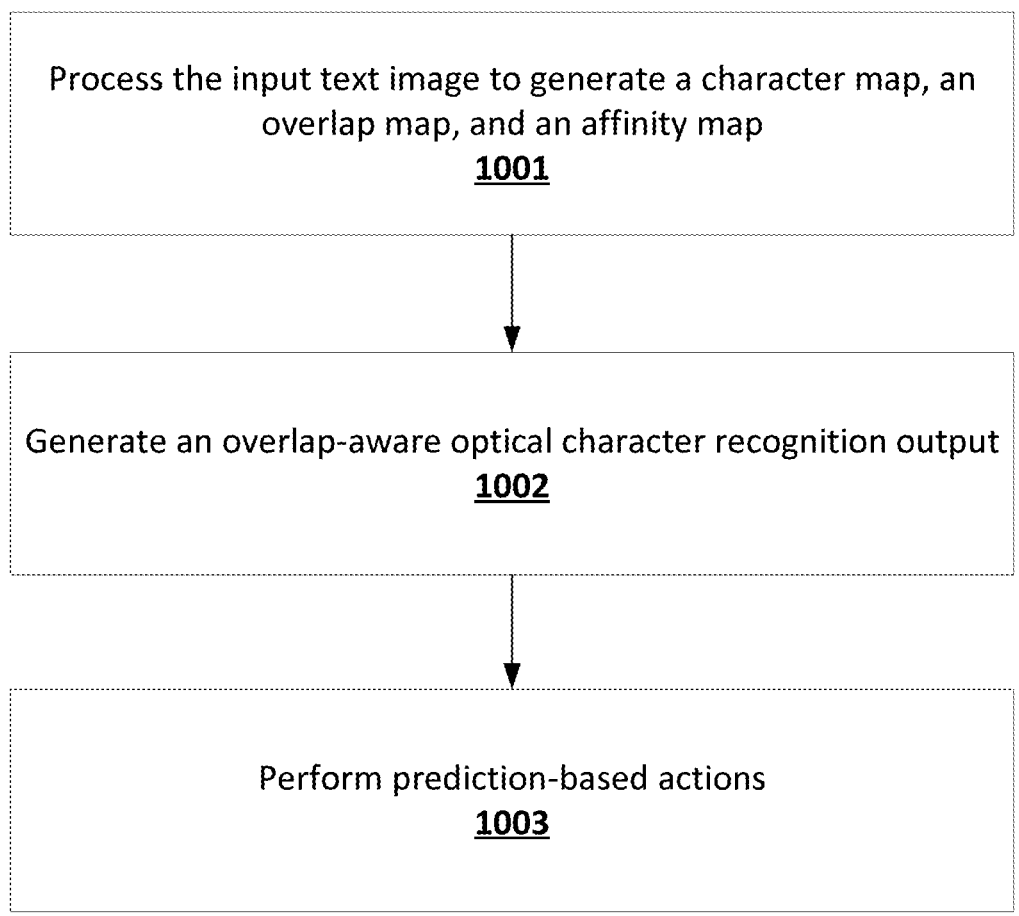
Figure 12:
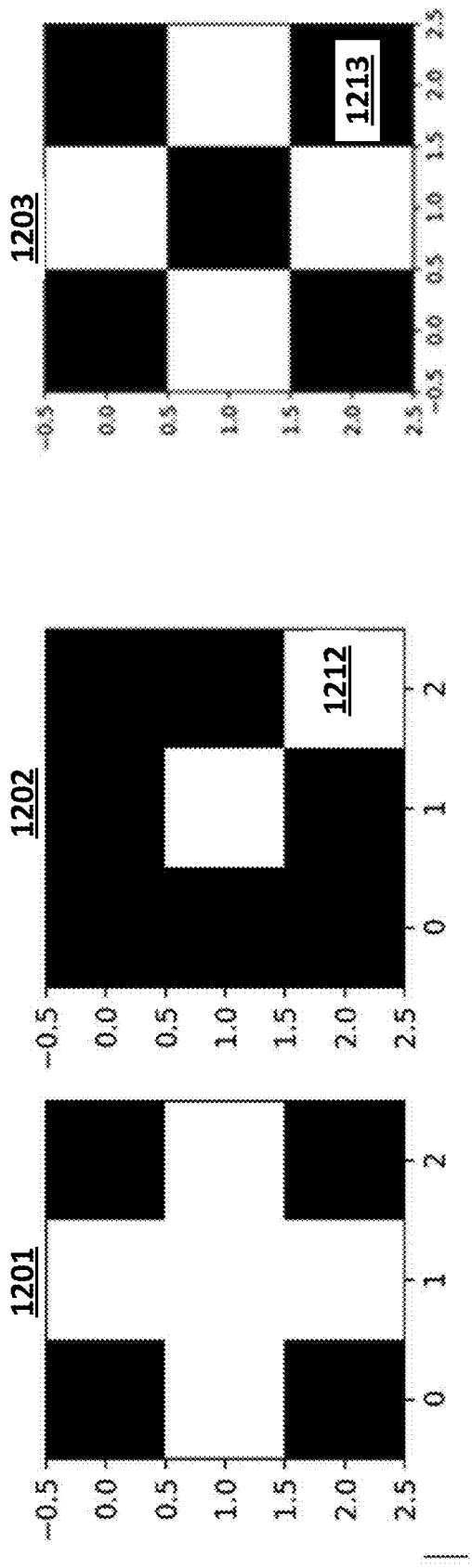
Figure 14:
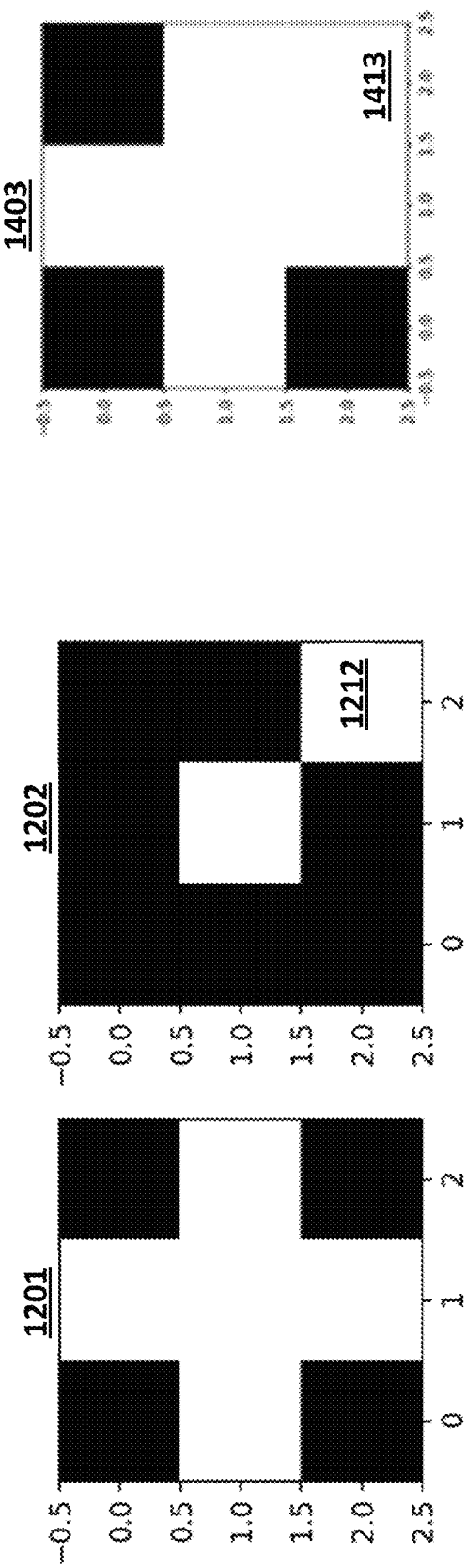
Figure 16:
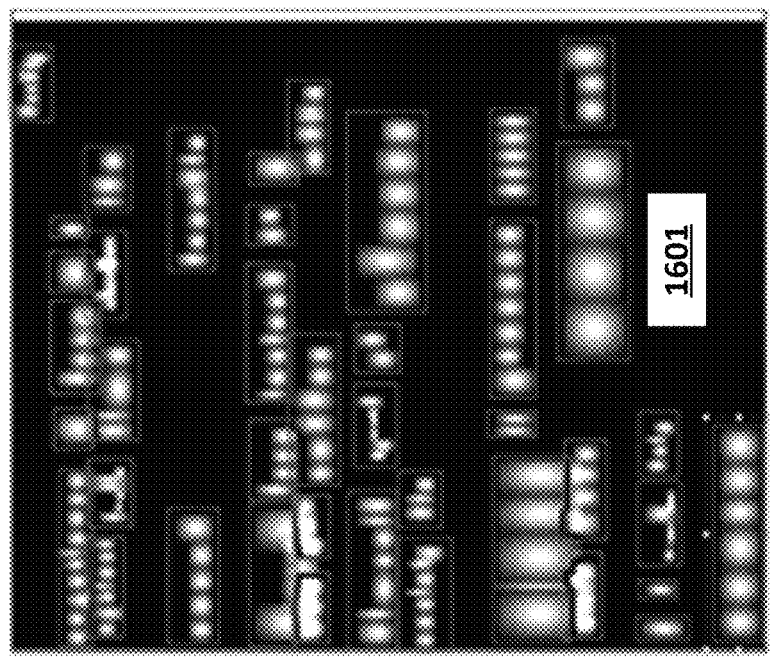
Figure 17:
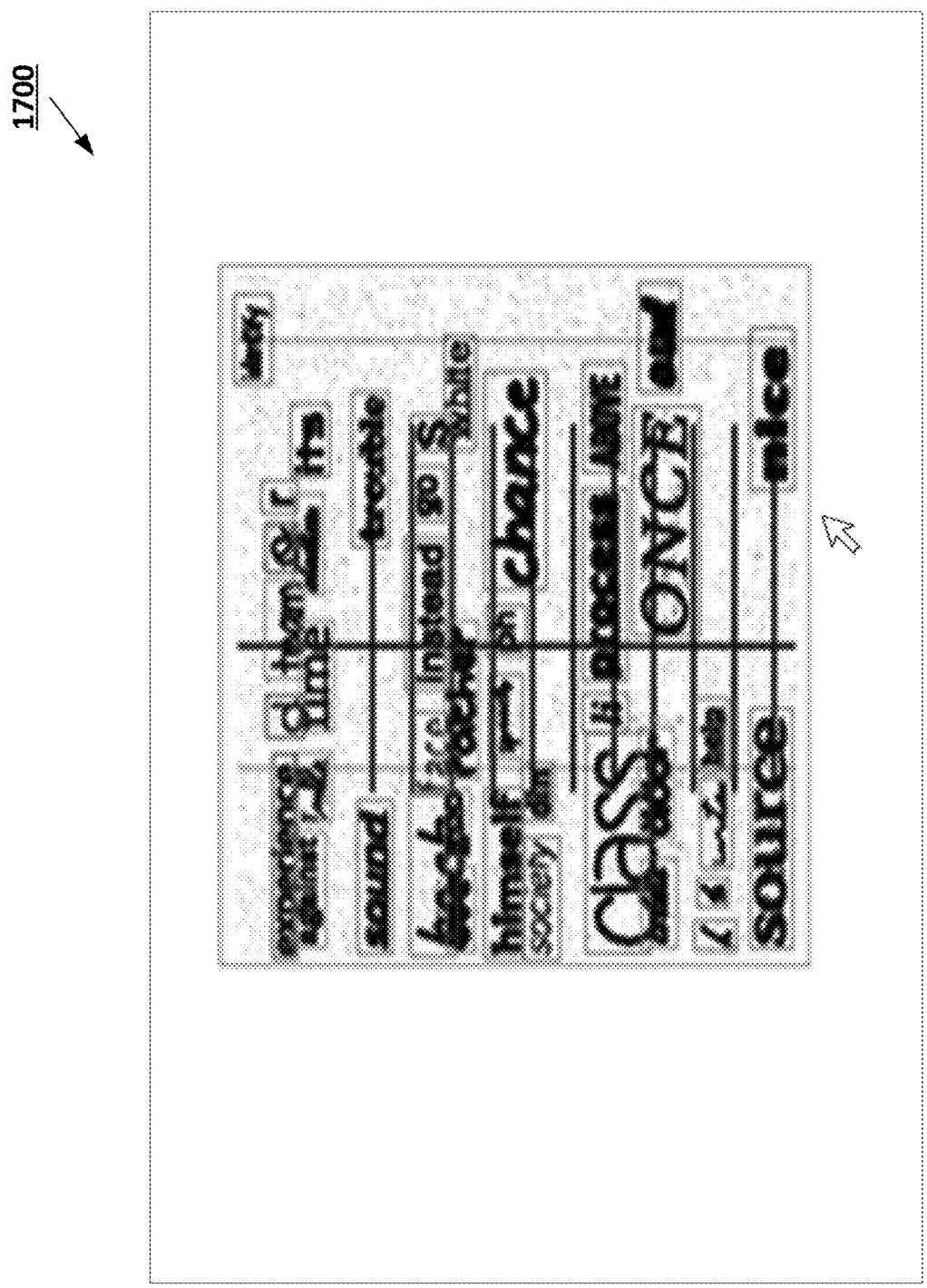

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 is a flowchart diagram of an example process for generating a deep character overlap detection machine learning model in accordance with some embodiments discussed herein;

FIG. 5 is a flowchart diagram of an example process for generating a synthetically-generated input text image in accordance with some embodiments discussed herein;

FIG. 6 provides operational examples of three text segment images corresponding to three random text segments in accordance with some embodiments discussed herein;

FIG. 7 provides an operational example of a character map in accordance with some embodiments discussed herein;

FIG. 8 provides an operational example of an overlap map in accordance with some embodiments discussed herein;

FIG. 9 provides an operational example of an affinity map in accordance with some embodiments discussed herein;

FIG. 10 is a flowchart diagram of an example process for performing predictive overlap-aware optical character recognition in relation to an input text image in accordance with some embodiments discussed herein;

FIG. 11 is a flowchart diagram of an example process for generating an overlap-aware word boundary recognition output for an input text image in accordance with some embodiments discussed herein;

FIG. 12 provides an operational example of an image-wise subtraction operation in accordance with some embodiments discussed herein;

FIG. 13 provides an operational example of generating an overlap-removed character map in accordance with some embodiments discussed herein;

FIG. 14 provides an operational example of an image-wise addition operation in accordance with some embodiments discussed herein;

FIG. 15 provides an operational example of generating an affinity-aware character map in accordance with some embodiments discussed herein;

FIG. 16 provides an operational example of an overlap-aware word boundary recognition output in accordance with some embodiments discussed herein; and FIG. 17 provides an operational example of a prediction output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Overview and Technical Advantages

Various embodiments of the present invention address technical challenges associated with efficiently and effectively performing overlap-aware optical character recognition. Various existing optical character recognition solutions are inefficient and ineffective in detecting text when characters have overlaps. To address the noted efficiency and effectiveness challenges, various embodiments of the present invention utilize deep character overlap detection machine learning models that are configured to generate three separate outputs: a character map, an overlap map, and an affinity map. Collectively, the three noted image maps include information that can be aggregated through defined image-wise arithmetic operations to perform overlap-aware optical character recognition in an efficient and effective manner.

In some embodiments, because deep character overlap detection machine learning models are configured to generate defined image maps rather than final optical character recognition outputs, such deep character overlap detection machine learning models can be trained with fewer amounts of training data and less training epochs compared to existing machine learning models that generate final optical character recognition outputs. This is in part because training routines for various existing machine learning models have to spend a substantial portion of time learning how to integrate predictive inference about addressing text overlap situations, a drawback that undermines the computational efficiency of training the noted existing machine learning models. This is part of the reason various existing optical character recognitions solutions have significant efficiency drawbacks. In comparison, the deep character overlap detection machine learning models described herein can be trained with fewer amounts of training data and with fewer number of training epochs, a feature that increases both storage-wise efficiency and computational efficiency of training the deep character overlap detection machine learning models described herein relative to various existing solutions for training various existing optical character recognition machine learning models.

Accordingly, in some embodiments, due to the more limited training data needed to train the deep character overlap detection machine learning models discussed herein, training the deep character overlap detection machine learning models described herein may require less storage resources relative to training various existing optical character recognition machine learning models. Moreover, in some embodiments, due to the fewer number of training epochs needed to train the deep character overlap detection machine learning models discussed herein, training the deep character overlap detection machine learning models discussed herein requires less processing resources and less processing cycles relative to training various existing optical character recognition machine learning models. In this way, by disclosing techniques for performing optical character recognitions using the image maps generated by deep character overlap detection machine learning models, various embodiments of the present invention improve the efficiency of performing machine-learning-based optical character recognition and make substantial technical contributions to the fields of machine learning, predictive data analysis, optical character recognition, natural language processing, and image processing.

Moreover, various embodiments of the present invention improve the effectiveness and reliability of performing optical character recognition. Experiments by the inventors have shown that the machine-learning-based optical character recognition techniques described herein are more capable of detecting accurate text from text images when the text image has text overlaps. This is in part because the deep character overlap detection machine learning models described herein generate image maps that are specifically configured to describe data regarding intersections of character regions and word regions. By generating a deep character overlap detection machine learning model that is configured to infer such granular data related to intersections of character regions and word regions and further by performing optical character recognition based at least in part on predictive inferences made based at least in part on the noted granular data, various embodiments of the present invention present solutions that vastly overperform existing machine-learning-based optical character recognition solutions in terms of accuracy and reliability of performing optical character text recognition. In doing so, various embodiments of the present invention improve the effectiveness and reliability of performing machine-learning-based optical character recognition and thus make substantial technical contributions to the fields of machine learning, predictive data analysis, optical character recognition, natural language processing, and image processing.

One application of some embodiments of the present invention relates to automated data extraction from scanned documents. In the field of automated data extraction from scanned documents, there are at least two critical processes: identifying exact locations of words in the document and extracting text (using optical character recognition) from every word that has been localized. During the first stage, there have been many methods invented that take advantage of proximity of characters in a word to group them as a single word. However, when the words are sometimes too close to each other in the vertical axis, all of the existing techniques identify them as a single word. Especially in forms where there is a very high chance that someone would write text that overlaps on existing printed text, the quality of extracted information can be negatively affected. To address the noted drawbacks of various existing automated data extraction solutions, various embodiments of the present invention propose a deep-learning-based solution that automatically infers text overlaps and returns words that are separated from each other despite text overlaps in input text images. Moreover, various embodiments of the present invention introduce techniques for image content recognition that are applicable to any overlapping entities in an image, such as non-text entities including logos.

Definitions of Certain Terms

The term "input text image" may refer to an electronically-stored data construct that is configured to describe an image file that is deemed to depict one or more characters (e.g., one or more textual signifiers, such as one or more alphanumeric characters). Examples of input text images include image files generated by scanning real-world text documents, including real-world text documents that only include text as well as real-world text documents that include text in addition to data having other data formats (e.g., images). In some embodiments, the input text image may depict characters via a collection of words, where a word may describe a positionally proximate unit of characters that are positioned in a manner such that the vertical distance between neighboring characters in a word is substantially less than the difference between neighboring characters across words. In some of the noted embodiments, the words depicted by an input text image may have overlaps such that the region occupied by at least one character of a first overlapping word partially intersects with the region occupied by at least one character of a second overlapping word. In some embodiments, when an input text image is generated by fitting at least one synthetically-generated text block into a blank image, the input text image is referred to as a synthetically-generated input text image. The input text image may be a two-dimensional array, such as a two-dimensional array that describes segment values (e.g., pixel values) of the input text image.

The term "character map" may refer to an electronically-stored data construct that is configured to describe one or more character regions of a corresponding input text image, where each character region is a region (e.g., a combination of one or more pixels) of the corresponding input text image that is deemed to depict a character. With respect to a synthetically-generated input text image, because the structure and the text segment region of each text segment image used to generate the synthetically-generated input text image is known, such structural/regional data can be used to infer what portions of the synthetically-generated input text image are occupied by a particular character of a random text segment that corresponds to a text segment image of the synthetically-generated input text image. In this manner, data describing how a synthetically-generated input text image was synthetically generated may be utilized to generate the character map for the synthetically-generated input text image. The character map may in some embodiments be a two-dimensional array.

The term "overlap map" may refer to an electronically-stored data construct that is configured to describe one or more character overlap regions of a corresponding input text image, where each character overlap region is a region (e.g., a combination of one or more pixels) of the corresponding input text image that is deemed to depict segments of two or more characters (i.e., a region of the corresponding input text image that is deemed to fall within two or more character regions). With respect to a synthetically-generated input text image, because the structure and the text segment region of each text segment image used to generate the synthetically-generated input text image is known, such structural/regional data can be used to infer what portions of the image are occupied by a particular character of the random text segment that corresponds to a text segment image of the synthetically-generated input text image, which can in turn be used to determine which regions of the synthetically-generated input text image occupy segments of two or more characters. In this manner, data describing how a synthetically-generated input text image was synthetically generated may be utilized to generate the overlap map for the synthetically-generated input text image. The overlap map may in some embodiments be a two-dimensional array.

The term "affinity map" may refer to an electronically-stored data construct that is configured to describe one or more character bridge regions of a corresponding input text image, where each character bridge region describes a region that is between (e.g., acts as a bridge between) two character regions in the corresponding input text image that correspond to two neighboring characters of a common word that is depicted by the corresponding input text image. With respect to a synthetically-generated input text image, because the structure and the text segment region of each text segment image used to generate the synthetically-generated input text image is known, such structural/regional data can be used to infer what portions of the image are occupied by a particular word of a random text segment that corresponds to a text segment image of the synthetically-generated input text image, which can in turn lead to a determination about which regions of the synthetically-generated input text image are a bridge between two or more neighboring characters of a common word. In this manner, data describing how a synthetically-generated input text image was synthetically generated may be utilized to generate the affinity map for the synthetically-generated input text image. The affinity map may in some embodiments be a two-dimensional array.

The term "deep character overlap detection machine learning model" may refer to an electronically-stored data construct that is configured to describe parameters, hyper-parameters, and/or defined operation of a processing model that is configured to process an input text image to generate a character map for the input text image, an overlap map for the input text image, and an affinity map for the input text image. In some embodiments, the deep character overlap detection machine learning model is a multi-output image segmentation machine learning model, where a multi-output image segmentation machine learning model may be configured to process one or more input images (e.g., a single input image) during each inferential epoch to generate two or more inferred images based at least in part on the one or more input images. An example of a multi-output image segmentation machine learning model is UNET, aspects of which are described in Ronneberger et al., U-Net: Convolutional Networks for Biomedical Image Segmentation (2015), arXiv:1505.04597 [cs.CV], available at https://arxiv.org/abs/1505.04597. Other examples of deep character overlap detection machine learning models include the ENet model (as described in Paszke et al., ENet: A Deep Neural Network Architecture for Real-Time Semantic Segmentation (2016), arXiv:1606.02147 [cs.CV], available at https://arxiv.org/abs/1606.02147) the BoxENet model (as described in Burkov et al., Deep neural networks with box convolutions, in Advances in Neural Information Processing Systems (2018), pp. 6211-6221).

The term "multi-output image segmentation machine learning model" may refer to an electronically-stored data construct that is configured to describe parameters, hyper-parameters, and/or defined operation of a machine learning model that is configured to process one or more input images (e.g., a single input image) during each inferential epoch to generate two or more inferred images based at least in part on the one or more input images. An example of a multi-output image segmentation machine learning model is UNET, aspects of which are described in Ronneberger et al., U-Net: Convolutional Networks for Biomedical Image Segmentation (2015), arXiv:1505.04597 [cs.CV], available at https://arxiv.org/abs/1505.04597. In some embodiments, training the deep character overlap detection machine learning model includes generating parameters for the deep character overlap detection machine learning model in order to optimize one or more utility models of the deep character overlap detection machine learning model, where the utility models are determined based at least in part on a measure of deviation between inferred output data for training input data (e.g., synthetically-generated input text images) for the multi-output image segmentation machine learning model and corresponding ground-truth data for the training input data. For example, the parameters of the multi-output image segmentation machine learning model may be optimized in a manner that is configured to: (i) optimize a utility model (e.g., minimize an error model or maximize a reward model) that is determined based at least in part on a measure of deviation between inferred character maps generated during training for training input text images and corresponding ground-truth character maps, (ii) optimize a utility model (e.g., minimize an error model or maximize a reward model) that is determined based at least in part on a measure of deviation between inferred overlap maps generated during training for training input text images and corresponding ground-truth overlap maps, and (iii) optimize a utility model (e.g., minimize an error model or maximize a reward model) that is determined based at least in part on a measure of deviation between inferred affinity maps generated during training for training input text images and corresponding ground-truth affinity maps.

The term "image-wise arithmetic operation" may refer to an electronically-stored data construct that is configured to describe a computer-implemented operation that generates a resultant image based at least in part on two or more input images, where the color intensity value of each segment of the result image (e.g., each pixel of the resultant image) is determined based at least in part on the color intensity values of the corresponding segments of the two or more input images. For example, assuming a hypothetical image-wise arithmetic operation denoted by D#E=F (where D and E are input images, F is the resultant images, and # is the hypothetical image-wise arithmetic operation), the color intensity of the [1, 1] pixel of F may be determined based at least in part on the color intensity of the [1, 1] pixel of D and the color intensity of the [1, 1] pixel of E. Examples of image-wise arithmetic operations include image-wise subtraction operations and image-wise addition operations, as further discussed below.

The term "image-wise subtraction operation" may refer to an electronically-stored data construct that is configured to describe an image-wise arithmetic operation that determines the color intensity of each defined segment of a resultant image as denoting a content-free color intensity (e.g., a black color intensity) if the corresponding defined segment of a corresponding subtracted image denotes a content-inclusive color intensity (e.g., a white color intensity). For example, given the image-wise subtraction operation D−E=F (where D is the primary image, E is the subtracted image, and F is the resultant image), if the color intensity of the [1, 1] pixel of E is white, then the color intensity of [1, 1] pixel of F may be black. In this way, the image-wise subtraction operation may be configured to "remove" the contents described by the subtracted image from the contents described by the primary image.

The term "image-wise addition operation" may refer to an electronically-stored data construct that is configured to describe an image-wise arithmetic operation that determines the color intensity of each defined segment of a resultant image as denoting a content-inclusive color intensity (e.g., a white color intensity) if the corresponding defined segment of at least one corresponding input image denotes the content-inclusive color intensity. For example, given the image-wise subtraction operation D+E=F (where D and E are input images and F is the resultant image), if the color intensity of the [1, 1] pixel of D is white and/or if the color intensity of the [1, 1] pixel of E is white, then the color intensity of [1, 1] pixel of F may be white. In this way, the image-wise addition operation may be configured to "add" the contents described by the two input images.

The term "overlap-removed character map" may refer to an electronically-stored data construct that is configured to describe a character map that is generated by performing an image-wise subtraction operation of an overlap map from an original character map. For example, given a character map C and an overlap map O, the overlap-removed character map may be generated via image-wise subtraction operation C−O. In this way, the overlap-removed character map may describe the contents of a character map but highlight the overlaps between characters using black space between characters. The overlay-removed character map may be a two-dimensional array.

The term "affinity-aware character map" may refer to an electronically-stored data construct that is configured to describe an overlap-removed character map that is generated through performing an image-wise addition operation with respect to an original overlap-removed character map and an affinity map. For example, given an overlap-removed character map (C−O) and an affinity map A, the affinity-aware character map may be generated via image-wise addition operation (C−O)+A. In this way, the affinity-aware character map may describe the contents of an overlap-removed character map but integrate affinity information provided by contents of an affinity map. The affinity-aware character map may be a two-dimensional array.

The term "overlap-aware word boundary recognition output" may refer to an electronically-stored data construct that is configured to describe one or more inferred word regions of an input text image, where each inferred word region is a region of the input text image that is deemed to include a word of the text described by the input text image. As described above, in some embodiments, generating the overlap-aware word boundary recognition output based at least in part on the affinity-aware character map comprises processing the affinity-aware character map using a connected component analysis machine learning model to generate the overlap-aware word boundary recognition output. In some embodiments, at least two of the inferred word regions described by the overlap-aware word boundary recognition output have at least a partial overlap. The overlap-aware word boundary recognition output may be a two-dimensional array.

The term "optimal character overlap ratio hyper-parameter" may refer to an electronically-stored data construct that is configured to describe a recommended ratio of characters depicted by a synthetically-generated input text image that are required to have at least some overlap with each other, where two characters may be deemed to overlap when at least one portion of the depiction of one overlapping character falls on the same image segment as the image segment for at least one portion of the depiction of the other overlapping character. For example, given an optimal character overlap ratio hyper-parameter of 0.20, at least one-fifth of characters depicted by an input text image are required to have a character overlap. This means that if, for example, an input text image depicts the words "Sound Proof" in such a manner that the character "S" has an overlap with the character "P," then the condition required by the optimal character overlap ratio hyper-parameter may be deemed satisfied.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

FIG. 1 is a schematic diagram of an example system architecture 100 for performing predictive data analysis steps/operations and generating corresponding user interface data (e.g., for providing and/or updating a user interface). The system architecture 100 includes a predictive data analysis system 101 comprising a predictive data analysis computing entity 106 configured to generate predictive outputs that lead to performing one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction-based action that may be generated by using the system architecture 100 includes performing optical character recognition.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 (e.g., management computing entity) may periodically update/provide raw input data (e.g., data objects describing primary events and/or secondary events) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106.

In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (U.S. SD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary System Operations

Various embodiments of the present invention address technical challenges associated with efficiently and effectively performing overlap-aware optical character recognition. Various existing optical character recognition solutions are inefficient and ineffective in detecting text when characters have overlaps. To address the noted efficiency and effectiveness challenges, various embodiments of the present invention utilize deep character overlap detection machine learning models that are configured to generate three separate outputs: a character map, an overlap map, and an affinity map. Collectively, the three noted image maps include information that can be aggregated through defined image-wise arithmetic operations to perform overlap-aware optical character recognition in an efficient and effective manner.

Described below are techniques for training a deep character overlap detection machine learning model and for using a trained deep character overlap detection machine learning model to perform overlap-aware optical character recognition. However, a person of ordinary skill in the relevant technology will recognize that a deep character overlap detection machine learning model can be trained using other techniques. Furthermore, a person of ordinary skill in the relevant technology will recognize that a trained deep character overlap detection machine learning can be used to perform predictive tasks other than overlap-aware optical character recognition. Moreover, although various embodiments of the present invention describe that training a deep character overlap detection machine learning model and using a trained deep character overlap detection machine learning model to perform overlap-aware optical character recognition are performed by a common computing entity, a person of ordinary skill in the relevant technology will recognize that separate compute entities may train a deep character overlap detection machine learning model and use a trained deep character overlap detection machine learning model to perform overlap-aware optical character recognition.

Training A Deep Character Overlap Detection Machine Learning Model

FIG. 4 is a flowchart diagram of an example process 400 for generating a deep character overlap detection machine learning model. Via the various steps/operations of the process 400, the predictive data analysis computing entity 106 can efficiently and effectively generate a deep character overlap detection machine learning model without the need for any training data beyond the training data that is synthetically generated in step/operation 401 of the process 400.

The process 400 begins at step/operation 401 when the predictive data analysis computing entity 106 generates one or more synthetically-generated input text images. While various embodiments of the present invention describe using training data that is synthetically generated, a person of ordinary skill in the relevant technology will recognize that training data generated using manual text annotation of existing input text images can also be used to train a deep character overlap machine learning model instead of or in addition to synthetically-generated input text images. The synthetic training data generation techniques described herein nevertheless enable the predictive data analysis computing entity 106 to train a deep character overlap detection machine learning model when such manually-annotated training data is not available.

In general, an input text image describes an image file that is deemed to depict one or more characters (e.g., one or more textual signifiers, such as one or more alphanumeric characters). Examples of input text images include image files generated by scanning real-world text documents, including real-world text documents that only include text as well as real-world text documents that include text in addition to data having other data formats (e.g., images). In some embodiments, the input text image may depict characters via a collection of words, where a word may describe a positionally proximate unit of characters that are positioned in a manner such that the vertical distance between neighboring characters in a word is substantially less than the difference between neighboring characters across words. In some of the noted embodiments, the words depicted by an input text image may have overlaps such that the region occupied by at least one character of a first overlapping word partially intersects with the region occupied by at least one character of a second overlapping word. In some embodiments, when an input text image is generated by fitting at least one synthetically-generated text block into a blank image, the input text image is referred to as a synthetically-generated input text image.

In some embodiments, step/operation 401 may be performed in accordance with the process that is depicted in FIG. 5 to generate a particular synthetically-generated input text image. The process that is depicted in FIG. 5 begins at step/operation 501 when the predictive data analysis computing entity 106 identifies a blank image (e.g., an image consisting of black space). In some embodiments, the predictive data analysis computing entity 106 generates the blank image based at least in part on a predefined image height hyper-parameter and a predefined image width hyper-parameter, where the predefined image height hyper-parameter may define the height of the blank image and the predefined image width hyper-parameter may define the width of the blank image.

At step/operation 502, the predictive data analysis computing entity 106 generates a plurality of random text segments (e.g., a plurality of random text words). In some embodiments, to generate each random text segment of the plurality of random text segments, the predictive data analysis computing entity 106 identifies (e.g., randomly generates) a selected content descriptor for the random text segment, and then generates the random text segment in accordance with the selected content descriptor.

At step/operation 503, the predictive data analysis computing entity 106 generates a plurality of text segment images for the plurality of random text segments. In some embodiments, the predictive data analysis computing entity 106 generates a text segment image for each random text segment of the plurality of random text segments. In some embodiments, to generate a text segment image for a random text segment, the predictive data analysis computing entity 106 first augments the random text segment with one or more randomly-generated augmentation properties, such a randomly-generated font, a randomly-generated boldness pattern, a randomly-generated italics pattern, a randomly-generated font size, a randomly-generated font scale, a randomly-generated rotation pattern, a randomly-generated character skewness pattern, and/or the like.

Operational examples of text segment images 601-603 are depicted in FIG. 6. As depicted in FIG. 6, text segment image 601 is associated with the content descriptor "Optum," the text segment image 602 is associated with the content descriptor "Global," and the text segment image 603 is associated with the content descriptor "Solutions."

Returning to FIG. 5, at step/operation 504, the predictive data analysis computing entity 106 inserts an initial text segment image of the plurality of text segment images within an initial text segment region of the blank image. For example, the initial text segment region may be determined in accordance with a particular starting location that is in turn identified based at least in part on a random index near a top-left corner of the blank image. After the predictive data analysis computing entity 106 determines the initial text segment region of the blank image, the predictive data analysis computing entity 106 inserts the initial segment within the initial text segment region.

At step/operation 505, for each subsequent text segment image of the plurality of text segment images, the predictive data analysis computing entity 106 inserts the subsequent text segment image on a subsequent text segment region of the blank image. In some embodiments, to identify the subsequent text segment region for a particular subsequent text segment image, the predictive data analysis computing entity 106 determines whether sufficient space to insert the subsequent text segment image is available to the right of a previously-inserted text segment region for a previously-inserted text segment image of the plurality of text segment images that was inserted immediately before the subsequent text segment image. In some embodiments, if the predictive data analysis computing entity 106 determines that sufficient space to insert the subsequent text segment image is available to the right of the previously-inserted text segment region, the predictive data analysis computing entity 106 determines the subsequent text segment image region for the particular subsequent text segment image to include a subset of the sufficient space that is sufficiently close to the right edge of the previously-inserted text segment region. In some embodiments, if the predictive data analysis computing entity 106 determines that sufficient space to insert the subsequent text segment image is not available to the right of the previously-inserted text segment region, the predictive data analysis computing entity 106 determines the subsequent text segment image region for the particular subsequent text segment image to include a subset of the space in the blank image that falls below the previously-inserted text segment region.

Importantly, in some embodiments, inserting subsequent text segment images on the blank image is performed in a manner that is configured to maintain an optimal character overlap ratio hyper-parameter. An optimal character overlap ratio hyper-parameter may describe a recommended ratio of characters depicted by a synthetically-generated input text image that are required to have at least some overlap with each other, where two characters may be deemed to overlap when at least one portion of the depiction of one overlapping character falls on the same image segment as the image segment for at least one portion of the depiction of the other overlapping character. For example, given an optimal character overlap ratio hyper-parameter of 0.20, at least one-fifth of characters depicted by an input text image are required to have a character overlap. This means that if, for example, an input text image depicts the words "Sound Proof" in such a manner that the character "S" has an overlap with the character "P," then the condition required by the optimal character overlap ratio hyper-parameter may be deemed satisfied.

At step/operation 506, subsequent to inserting all of the plurality of text segment images, the predictive data analysis computing entity 106 performs one or more image augmentation operations on the blank image to generate the particular synthetically-generated input text image. One objective of image augmentation operations may be to enhance training accuracy of a deep character overlap detection machine learning model, an objective that may in some embodiments be accomplished by introducing illustration diversity across synthetically-generated input text images to increase the likelihood that the synthetically-generated input text images represent illustration diversities of non-synthetically-generated input text images that may be presented as inputs to a trained deep character overlap detection machine learning model. Examples of image augmentation operations include background noise infusion operation, vertical line infusion operations, and/or the like.

Returning to FIG. 4, at step/operation 402, the predictive data analysis computing entity 106 generates ground-truth data for the synthetically-generated images. While various embodiments of the present invention describe using data describing how synthetically-generated input text images were generated to generate ground-truth data for the synthetically-generated input text images, a person of ordinary skill in the relevant technology will recognize that various embodiments of the present invention may utilize manual annotation data for non-synthetically-generated input text images to generate ground-truth data for such non-synthetically-generated input text images. In general, a deep character overlap detection machine learning model may be trained with one or more of the following: (i) synthetically-generated input text images and corresponding ground-truth data, and (ii) non-synthetically-generated input text images and corresponding ground-truth data. Examples of ground-truth data for an input text image include a character map for the input text image, an overlap map for the input text image, and an affinity map for the input text image.

A character map may describe one or more character regions of a corresponding input text image, where each character region is a region (e.g., a combination of one or more pixels) of the corresponding input text image that is deemed to depict a character. With respect to a synthetically-generated input text image, because the structure and the text segment region of each text segment image used to generate the synthetically-generated input text image is known, such structural/regional data can be used to infer what portions of the synthetically-generated input text image are occupied by a particular character of a random text segment that corresponds to a text segment image of the synthetically-generated input text image. In this manner, data describing how a synthetically-generated input text image was synthetically generated may be utilized to generate the character map for the synthetically-generated input text image. In some embodiments, to generate a character map, the predictive data analysis computing entity 106 identifies the center of each character in an input text image and generates a Gaussian heatmap with the center having the highest intensity and the intensity fading gradually along the top and bottom edges of the character.

An operational example of a character map 702 is depicted in FIG. 7. The character map 702 of FIG. 7 is generated based at least in part on the input text image 701. As depicted in FIG. 7, each bounding box of the character map 702 corresponds to a character region that in turn depicts a character associated with the corresponding input text image. For example, the collection of bounding boxes 712 correspond to the text segment image that in turn corresponds to the random text segment "experience."

An overlap map may describe one or more character overlap regions of a corresponding input text image, where each character overlap region is a region (e.g., a combination of one or more pixels) of the corresponding input text image that is deemed to depict segments of two or more characters (i.e., a region of the corresponding input text image that is deemed to fall within two or more character regions). With respect to a synthetically-generated input text image, because the structure and the text segment region of each text segment image used to generate the synthetically-generated input text image is known, such structural/regional data can be used to infer what portions of the image are occupied by a particular character of the random text segment that corresponds to a text segment image of the synthetically-generated input text image, which can in turn be used to determine which regions of the synthetically-generated input text image occupy segments of two or more characters. In this manner, data describing how a synthetically-generated input text image was synthetically generated may be utilized to generate the overlap map for the synthetically-generated input text image. In some embodiments, to generate an overlay map, the predictive data analysis computing entity 106 identifies overlaps between words using word-level bounding boxes.

An operational example of an overlap map 802 is depicted in FIG. 8. The overlap map 802 is generated based at least in part on the input text image 701. As depicted in FIG. 8, each bounding box of the overlap map 802 corresponds to a character overlap region that in turn depicts segments of two or more characters. For example, as depicted in the overlap map 802 of FIG. 7, the bounding box 812 depicts the region of overlap of some of the character regions associated with the text segment image corresponding to the random text segment "experience" and some of the character regions associated with the text segment image corresponding to the random text segment "against" in the input text image 701.

An affinity map may describe one or more character bridge regions of a corresponding input text image, where each character bridge region describes a region that is between (e.g., acts as a bridge between) two character regions in the corresponding input text image that correspond to two neighboring characters of a common word that is depicted by the corresponding input text image. With respect to a synthetically-generated input text image, because the structure and the text segment region of each text segment image used to generate the synthetically-generated input text image is known, such structural/regional data can be used to infer what portions of the image are occupied by a particular word of a random text segment that corresponds to a text segment image of the synthetically-generated input text image, which can in turn lead to a determination about which regions of the synthetically-generated input text image are a bridge between two or more neighboring characters of a common word. In this manner, data describing how a synthetically-generated input text image was synthetically generated may be utilized to generate the affinity map for the synthetically-generated input text image. In some embodiments, to generate an affinity map, the predictive data analysis computing entity 106 identifies characters by generating a Gaussian heatmap whose density is high at the mid-point between two characters and whose density increases gradually closer to the character boundaries.

An operational example of an affinity map 902 is depicted in FIG. 9. The affinity map 902 is generated based at least in part on the input text image 701. As depicted in FIG. 9, each bounding box of the affinity map 902 corresponds to a character bridge region that in turn describes a bridge between two or more neighboring characters of a common word. For example, the bounding box 912 depicts the region corresponding to a bridge between the character "e" and the character "x" in the word "experience."

At step/operation 403, the predictive data analysis computing entity 106 trains the deep character overlap detection machine learning model using the synthetically-generated training data and the corresponding ground-truth data. While various embodiments of the present invention disclose training the deep character overlap detection machine learning model using the synthetically-generated training data and the corresponding ground-truth data, a person of ordinary skill in the relevant technology will recognize that a deep character overlap detection machine learning model may be trained with one or more of the following: (i) synthetically-generated input text images and corresponding ground-truth data, and (ii) non-synthetically-generated input text images and corresponding ground-truth data.

A deep character overlap detection machine learning model may be configured to process an input text image to generate a character map for the input text image, an overlap map for the input text image, and an affinity map for the input text image. In some embodiments, the deep character overlap detection machine learning model is a multi-output image segmentation machine learning model, where a multi-output image segmentation machine learning model may be configured to process one or more input images (e.g., a single input image) during each inferential epoch to generate two or more inferred images based at least in part on the one or more input images. An example of a multi-output image segmentation machine learning model is UNET, aspects of which are described in Ronneberger et al., U-Net: Convolutional Networks for Biomedical Image Segmentation (2015), arXiv:1505.04597 [cs.CV], available at https://arxiv.org/abs/1505.04597. Other examples of deep character overlap detection machine learning models include the ENet model (as described in Paszke et al., ENet: A Deep Neural Network Architecture for Real-Time Semantic Segmentation (2016), arXiv:1606.02147 [cs.CV], available at https://arxiv.org/abs/1606.02147) the BoxENet model (as described in Burkov et al., Deep neural networks with box convolutions, in Advances in Neural Information Processing Systems (2018), pp. 6211-6221).

In some embodiments, training the deep character overlap detection machine learning model includes generating parameters for the deep character overlap detection machine learning model in order to optimize one or more utility models of the deep character overlap detection machine learning model, where the utility models are determined based at least in part on a measure of deviation between inferred output data for training input data (e.g., synthetically-generated input text images) for the deep character overlap detection machine learning model and corresponding ground-truth data for the training input data. For example, the parameters of the deep character overlap detection machine learning model may be optimized in a manner that is configured to: (i) optimize a utility model (e.g., minimize an error model or maximize a reward model) that is determined based at least in part on a measure of deviation between inferred character maps generated during training for training input text images and corresponding ground-truth character maps, (ii) optimize a utility model (e.g., minimize an error model or maximize a reward model) that is determined based at least in part on a measure of deviation between inferred overlap maps generated during training for training input text images and corresponding ground-truth overlap maps, and (iii) optimize a utility model (e.g., minimize an error model or maximize a reward model) that is determined based at least in part on a measure of deviation between inferred affinity maps generated during training for training input text images and corresponding ground-truth affinity maps.

Performing Overlap-Aware Optical Character Recognition

FIG. 10 is a flowchart diagram of an example process 1000 for performing predictive overlap-aware optical character recognition in relation to an input text image. Via the various steps/operations of the process 1000, the predictive data analysis computing entity 106 can utilize a trained deep character overlap machine learning model (e.g., a deep character overlap machine learning model that is trained in accordance with the process 400 of FIG. 4) to perform efficient and effective predictive overlap-aware optical character recognition in relation to an input text image.

The process 1000 begins at step/operation 1001 when the predictive data analysis computing entity 106 processes the input text image using a deep character overlap machine learning model (e.g., a deep character overlap machine learning model that is trained in accordance with the process 400 of FIG. 4) to generate a character map for the input text image, an overlap map for the input text image, and an affinity map for the input text image.

As described above, a deep character overlap detection machine learning model may be configured to process an input text image to generate a character map for the input text image, an overlap map for the input text image, and an affinity map for the input text image. In some embodiments, the deep character overlap detection machine learning model is a multi-output image segmentation machine learning model, where a multi-output image segmentation machine learning model may be configured to process one or more input images (e.g., a single input image) during each inferential epoch to generate two or more inferred images based at least in part on the one or more input images. An example of a multi-output image segmentation machine learning model is UNET, aspects of which are described in Ronneberger et al., U-Net: Convolutional Networks for Biomedical Image Segmentation (2015), arXiv:1505.04597 [cs.CV], available at https://arxiv.org/abs/1505.04597. Other examples of deep character overlap detection machine learning models include the ENet model (as described in Paszke et al., ENet: A Deep Neural Network Architecture for Real-Time Semantic Segmentation (2016), arXiv: 1606.02147 [cs.CV], available at https://arxiv.org/abs/1606.02147) the BoxENet model (as described in Burkov et al., Deep neural networks with box convolutions, in Advances in Neural Information Processing Systems (2018), pp. 6211-6221).

In some embodiments, an input text image is provided as an input of one or more inputs to the deep character overlap detection machine learning model, where the deep character overlap detection machine learning model is configured to provide the noted inputs to generate a set of outputs that includes: a character map for the input text image, an overlap map for the input text image, and an affinity map for the input text image. In some embodiments, the input text image is a matrix, where each matrix value is a color value for a segment (e.g., a pixel) of the corresponding image. In some embodiments, the character map is a matrix, where each matrix value is a character map value for a segment (e.g., a pixel) of the corresponding image. In some embodiments, the affinity map is a matrix, where each matrix value is an affinity map value for a segment (e.g., a pixel) of the corresponding image. In some embodiments, the overlap map is a matrix, where each matrix value is an overlap map value for a segment (e.g., a pixel) of the corresponding image.

As further described above, a character map may describe one or more character regions of a corresponding input text image, where each character region is a region (e.g., a combination of one or more pixels) of the corresponding input text image that is deemed to depict a character. Furthermore, an overlap map may describe one or more character overlap regions of a corresponding input text image, where each character overlap region is a region (e.g., a combination of one or more pixels) of the corresponding input text image that is deemed to depict segments of two or more characters. Moreover, an affinity map may describe one or more character bridge regions of a corresponding input text image, where each character bridge region describes a region is between (e.g., acts as a bridge between) two character regions in the corresponding input text image that correspond to two neighboring characters of a common word that is depicted by the corresponding input text image.

At step/operation 1002, the predictive data analysis computing entity 106 generates an overlap-aware word boundary recognition output based at least in part on the character map, the overlap map, and the affinity map. In some embodiments, the predictive data analysis computing entity 106 performs a set of defined image-wise arithmetic operations across the character map, the overlap map, and the affinity map to generate an affinity-aware character map that can then be used to generate an overlap-aware word boundary recognition output.

In general, an image-wise arithmetic operation may be an operation that generates a resultant image based at least in part on two or more input images, where the color intensity value of each segment of the result image (e.g., each pixel of the resultant image) is determined based at least in part on the color intensity values of the corresponding segments of the two or more input images. For example, assuming a hypothetical image-wise arithmetic operation denoted by D # E=F (where D and E are input images, F is the resultant images, and # is the hypothetical image-wise arithmetic operation), the color intensity of the [1, 1] pixel of F may be determined based at least in part on the color intensity of the [1, 1] pixel of D and the color intensity of the [1, 1] pixel of E. Examples of image-wise arithmetic operations include image-wise subtraction operations and image-wise addition operations, as further discussed below.

In some embodiments, step/operation 1002 can be performed in accordance with the process that is depicted in FIG. 11. The process that is depicted in FIG. 11 begins at step/operation 1101 when the predictive data analysis computing entity 106 performs an image-wise subtraction operation of the overlap map from the character map to generate an overlap-removed character map.

An image-wise subtraction operation may be an image-wise arithmetic operation that determines the color intensity of each defined segment of a resultant image as denoting a content-free color intensity (e.g., a black color intensity) if the corresponding defined segment of a corresponding subtracted image denotes a content-inclusive color intensity (e.g., a white color intensity). For example, given the image-wise subtraction operation D−E=F (where D is the primary image, E is the subtracted image, and F is the resultant image), if the color intensity of the [1, 1] pixel of E is white, then the color intensity of [1, 1] pixel of F may be black. In this way, the image-wise subtraction operation may be configured to "remove" the contents described by the subtracted image from the contents described by the primary image.

An operational example of an image-wise subtraction operation is depicted in FIG. 12. As depicted in FIG. 12, the resultant image 1203 is generated by subtracting the input image 1202 from the input image 1201. For example, the pixel 1213 of the resultant image 1203 has a black value because the corresponding pixel 1212 of the input image 1202 has a white value.

An overlap-removed character map may be a character map that is generated by performing an image-wise subtraction operation of an overlap map from an original character map. For example, given a character map C and an overlap map O, the overlap-removed character map may be generated via image-wise subtraction operation C−O. In this way, the overlap-removed character map may describe the contents of a character map but highlight the overlaps between characters using black space between characters.

An operational example of an overlap-removed character map 1303 is depicted in FIG. 13. As depicted in FIG. 13, the overlap-removed character map 1303 is generated by subtracting the overlap map 802 from the character map 702.

At step/operation 1102, the predictive data analysis computing entity 106 performs an image-wise addition operation of the overlap-removed character map and the affinity map to generate an affinity-aware character map. In some embodiments, the predictive data analysis computing entity 106 performs the image-wise addition operation with respect to the overlap-removed character map that is generated at step/operation 1101 and the affinity map that is generated at step/operation 1001 to generate the affinity-aware character map.

An image-wise addition operation may be an image-wise arithmetic operation that determines the color intensity of each defined segment of a resultant image as denoting a content-inclusive color intensity (e.g., a white color intensity) if the corresponding defined segment of at least one corresponding input image denotes the content-inclusive color intensity. For example, given the image-wise subtraction operation D+E=F (where D and E are input images and F is the resultant image), if the color intensity of the [1, 1] pixel of D is white and/or if the color intensity of the [1, 1] pixel of E is white, then the color intensity of [1, 1] pixel of F may be white. In this way, the image-wise addition operation may be configured to "add" the contents described by the two input images.

An operational example of an image-wise addition operation is depicted in FIG. 14. As depicted in FIG. 14, the resultant image 1403 is generated by adding the input image 1201 to the input image 1202. For example, the pixel 1413 of the resultant image 1403 has a white value because the corresponding pixel 1212 of the input image 1202 has a white value.

An affinity-aware character map may be an overlap-removed character map that is generated through performing an image-wise addition operation with respect to an original overlap-removed character map and an affinity map. For example, given an overlap-removed character map (C−O) and an affinity map A, the affinity-aware character map may be generated via image-wise addition operation (C−O)+A. In this way, the affinity-aware character map may describe the contents of an overlap-removed character map but integrate affinity information provided by contents of an affinity map.

An operational example of an affinity-aware character map 1503 is depicted in FIG. 15. As depicted in FIG. 15, the affinity-aware character map 1503 is generated by adding the overlap-removed character map 1303 and the affinity map 902.

At step/operation 1103, the predictive data analysis computing entity 106 generates the overlap-aware word boundary recognition output based at least in part on the affinity-aware character map. In some embodiments, generating the overlap-aware word boundary recognition output based at least in part on the affinity-aware character map comprises processing the affinity-aware character map using a connected component analysis machine learning model to generate the overlap-aware word boundary recognition output.

The overlap-aware word boundary recognition output may describe one or more inferred word regions of an input text image, where each inferred word region is a region of the input text image that is deemed to include a word of the text described by the input text image. As described above, in some embodiments, generating the overlap-aware word boundary recognition output based at least in part on the affinity-aware character map comprises processing the affinity-aware character map using a connected component analysis machine learning model to generate the overlap-aware word boundary recognition output. In some embodiments, at least two of the inferred word regions described by the overlap-aware word boundary recognition output have at least a partial overlap. An operational example of an overlap-aware word boundary recognition output 1600 is depicted in FIG. 16. Each bounding box depicted in the overlap-aware word boundary recognition output 1600 (e.g., the bounding box 1601) corresponds to an inferred word region of a corresponding input text image.

Returning to FIG. 10, at step/operation 1003, the predictive data analysis computing entity 106 performs one or more prediction-based actions based at least in part on the overlap-aware word boundary recognition output. In some embodiments, to perform the one or more prediction-based actions, the predictive data analysis computing entity 106 generates a transcribed version of each inferred word region described by the overlap-aware word boundary recognition output, and subsequently depicts a prediction output user interface that depicts inferred word regions along with their transcribed text. An operational example of such a prediction output user interface 1700 is depicted in FIG. 17.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and using a deep character overlap detection machine learning model applied to an input text image, a character map, an overlap map, and an affinity map for the input text image;
generating, by the one or more processors, an overlap-aware word boundary recognition output, wherein: (i) the overlap-aware word boundary recognition output describes one or more inferred word regions of the input text image, and (ii) the overlap-aware word boundary recognition output is generated by:

(a) performing an image-wise subtraction operation of the overlap map from the character map to generate an overlap-removed character map, (b) performing an image-wise addition operation of the overlap-removed character map and the affinity map to generate an affinity-aware character map, and (c) generating the overlap-aware word boundary recognition output based at least in part on the affinity-aware character map; and initiating, by the one or more processors, performance of one or more prediction-based actions based at least in part on the overlap-aware word boundary recognition output.

2. The computer-implemented method of claim 1, wherein the character map comprises a plurality of character regions depicted by the input text image.

3. The computer-implemented method of claim 1, wherein the overlap map comprises one or more character overlap regions depicted by the input text image.

4. The computer-implemented method of claim 1, wherein the affinity map comprises one or more character bridge regions depicted by the input text image.

5. The computer-implemented method of claim 1, wherein generating the overlap-aware word boundary recognition output further comprises processing the affinity-aware character map using a connected component analysis machine learning model.

6. The computer-implemented method of claim 1, wherein the deep character overlap detection machine learning model is a multi-output image segmentation machine learning model.

7. An apparatus comprising at least one processor and at least one memory including program code, the at least one memory and the program code configured to, with the at least one processor, cause the apparatus to at least:

generate and using a deep character overlap detection machine learning model applied to the input text image, a character map, an overlap map, and an affinity map for the input text image;

generate an overlap-aware word boundary recognition output, wherein: (i) the overlap-aware word boundary recognition output describes one or more inferred word regions of the input text image, and (ii) the overlap-aware word boundary recognition output is generated by:

(a) performing an image-wise subtraction operation of the overlap map from the character map to generate an overlap-removed character map, (b) performing an image-wise addition operation of the overlap-removed character map and the affinity map to generate an affinity-aware character map, and (c) generating the overlap-aware word boundary recognition output based at least in part on the affinity-aware character map; and initiate the performance of one or more prediction-based actions based at least in part on the overlap-aware word boundary recognition output.

8. The apparatus of claim 7, wherein the character map comprises a plurality of character regions depicted by the input text image.

9. The apparatus of claim 7, wherein the overlap map comprises one or more character overlap regions depicted by the input text image.

10. The apparatus of claim 7, wherein the affinity map comprises one or more character bridge regions depicted by the input text image.

11. The apparatus of claim 7, wherein generating the overlap-aware word boundary recognition output further comprises processing the affinity-aware character map using a connected component analysis machine learning model.

12. The apparatus of claim 7, wherein the deep character overlap detection machine learning model is a multi-output image segmentation machine learning model.

13. A computer program product comprising at least one non-transitory computer-readable storage medium having computer-readable program code portions stored therein that, when executed by one or more processors, cause the one or more processors to:

generate, using a deep character overlap detection machine learning model applied to the input text image, a character map, an overlap map, and an affinity map for the input text image;

generate an overlap-aware word boundary recognition output, wherein: (i) the overlap-aware word boundary recognition output describes one or more inferred word regions of the input text image, and (ii) the overlap-aware word boundary recognition output is generated by:

(a) performing an image-wise subtraction operation of the overlap map from the character map to generate an overlap-removed character map, (b) performing an image-wise addition operation of the overlap-removed character map and the affinity map to generate an affinity-aware character map, and (c) generating the overlap-aware word boundary recognition output based at least in part on the affinity-aware character map; and initiate performing of perform one or more prediction-based actions based at least in part on the overlap-aware word boundary recognition output.

14. The computer program product of claim 13, wherein the character map comprises a plurality of character regions depicted by the input text image.

15. The computer program product of claim 13, wherein the overlap map comprises one or more character overlap regions depicted by the input text image.

16. The computer program product of claim 13, wherein the affinity map comprises one or more character bridge regions depicted by the input text image.

17. The computer program product of claim 13, wherein the deep character overlap detection machine learning model is a multi-output image segmentation machine learning model.

* * * * *

UNITED STATES PATENT AND TRADEMARK OFFICE
CERTIFICATE OF CORRECTION

PATENT NO. : 11,682,220 B2
APPLICATION NO. : 17/201778
DATED : June 20, 2023
INVENTOR(S) : V Kishore Ayyadevara et al.

It is certified that error appears in the above-identified patent and that said Letters Patent is hereby corrected as shown below:

In the Claims

In Column 28, Line 41, Claim 13, delete "perform one" and insert -- one --, therefor.

Signed and Sealed this
Twenty-sixth Day of September, 2023

Katherine Kelly Vidal
*Director of the United States Patent and Trademark Office*